Dec. 22, 1959 H. G. EVERS 2,918,530

TELEPHONE SYSTEM COMPRISING MULTI-FUNCTION DIAL BACK ADAPTER FOR OPERATOR CONNECTIONS AND TOLL TICKETING IN NON-RECORDER EXCHANGES

Filed Nov. 4, 1955 2 Sheets-Sheet 1

Inventor:
Harry G. Evers
By [signature] Atty.

Dec. 22, 1959 H. G. EVERS 2,918,530

TELEPHONE SYSTEM COMPRISING MULTI-FUNCTION DIAL BACK ADAPTER FOR OPERATOR CONNECTIONS AND TOLL TICKETING IN NON-RECORDER EXCHANGES

Filed Nov. 4, 1955 2 Sheets-Sheet 2

Inventor:
Harry G. Evers.
By: [signature] Atty.

United States Patent Office 2,918,530
Patented Dec. 22, 1959

2,918,530

TELEPHONE SYSTEM COMPRISING MULTI-FUNCTION DIAL BACK ADAPTER FOR OPERATOR CONNECTIONS AND TOLL TICKETING IN NON-RECORDER EXCHANGES

Harry G. Evers, Genoa, Ill., assignor to Leich Electric Company, Genoa, Ill., a corporation of Illinois Application November 4, 1955, Serial No. 545,077

5 Claims. (Cl. 179—7.1)

This invention relates to dial trunk operation between a local non-recorder dial exchange and a distant toll exchange, and is particularly concerned with a multi-function dial back trunk adapter cooperating with a trunk and a trunk switch associated therewith and providing among other features for operator supervised connections and for toll ticketing of calls at the distant exchange.

One object is to provide an adapter cooperating with a trunk and an associated trunk switch, over which incoming calls from a distant exchange may be completed by an operator or by a subscriber by way of toll ticketing equipment at the distant exchange.

Another object is to provide an adapter cooperating with a trunk and associated trunk switch for extending outgoing calls to toll ticketing equipment or to a toll operator at a distant toll exchange who may extend the call beyond the toll exchange or may dial back through the adapter and the trunk switch to another exchange, the operator retaining supervision of the call.

A further object is to employ the adapter on outgoing toll ticketing calls over automatic recording equipment at the distant exchange, for the purpose of causing the adapter to control the trunk switch associated with the trunk involved to set up a verification call to the calling local station coincident with the registering of the corresponding call in the distant recording means; a tone check circuit being provided for cooperation with the adapter to allow the call to proceed upon proper identification of the calling local line, or to disconnect so as to free the trunk, if the local station number has not been dialed correctly.

Another object and feature is to provide an adapter cooperating with a trunk and associated trunk switch, comprising means for simplex and composite signaling including a signal relay and a signal conductor extending therefrom to the distant exchange and terminating in such distant exchange in suitable control means, and means for variably controlling said relay and said control means to transmit signals for supervisory, for toll ticketing, and call extension purposes on incoming and on outgoing calls.

Still another object is to provide an adapter cooperating with a trunk and associated trunk switch and comprising relay and circuit means coacting with trunk rotation and signaling and supervisory means, to provide for all signaling and supervisory functions required for incoming and outgoing calls involving an operator or toll ticketing calls, respectively.

Figure 1:
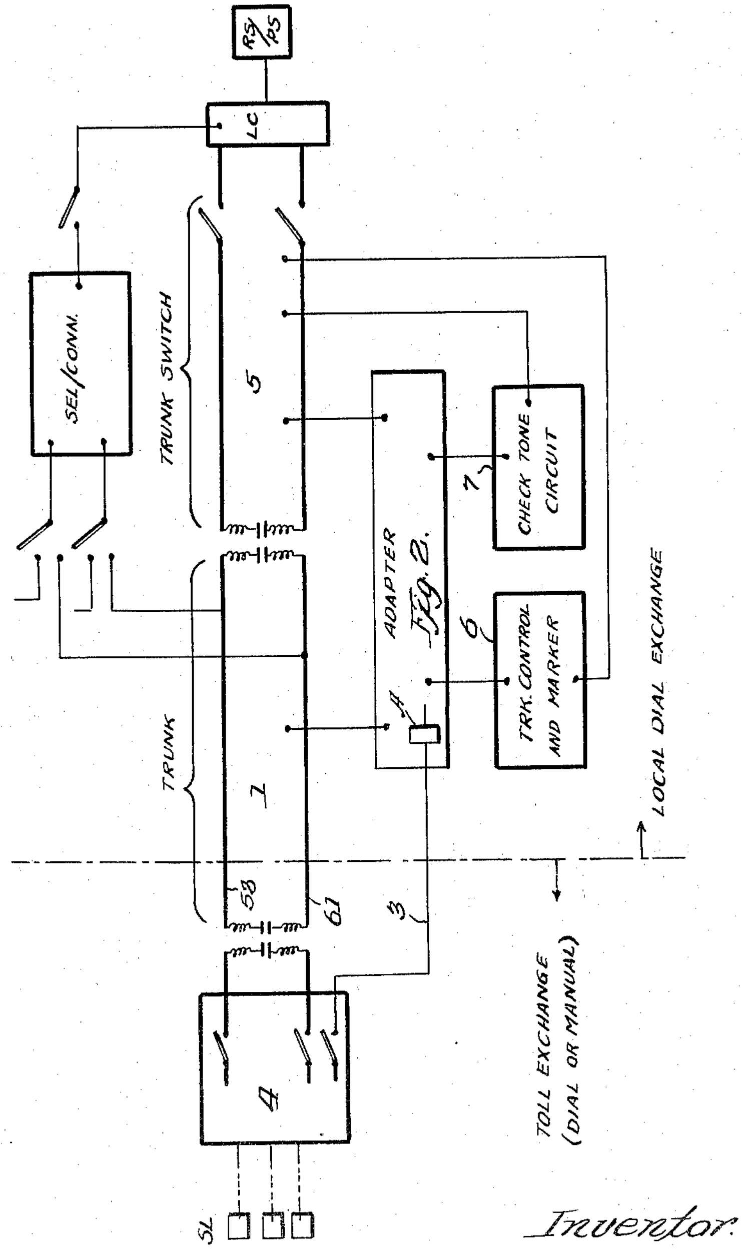
Figure 2:
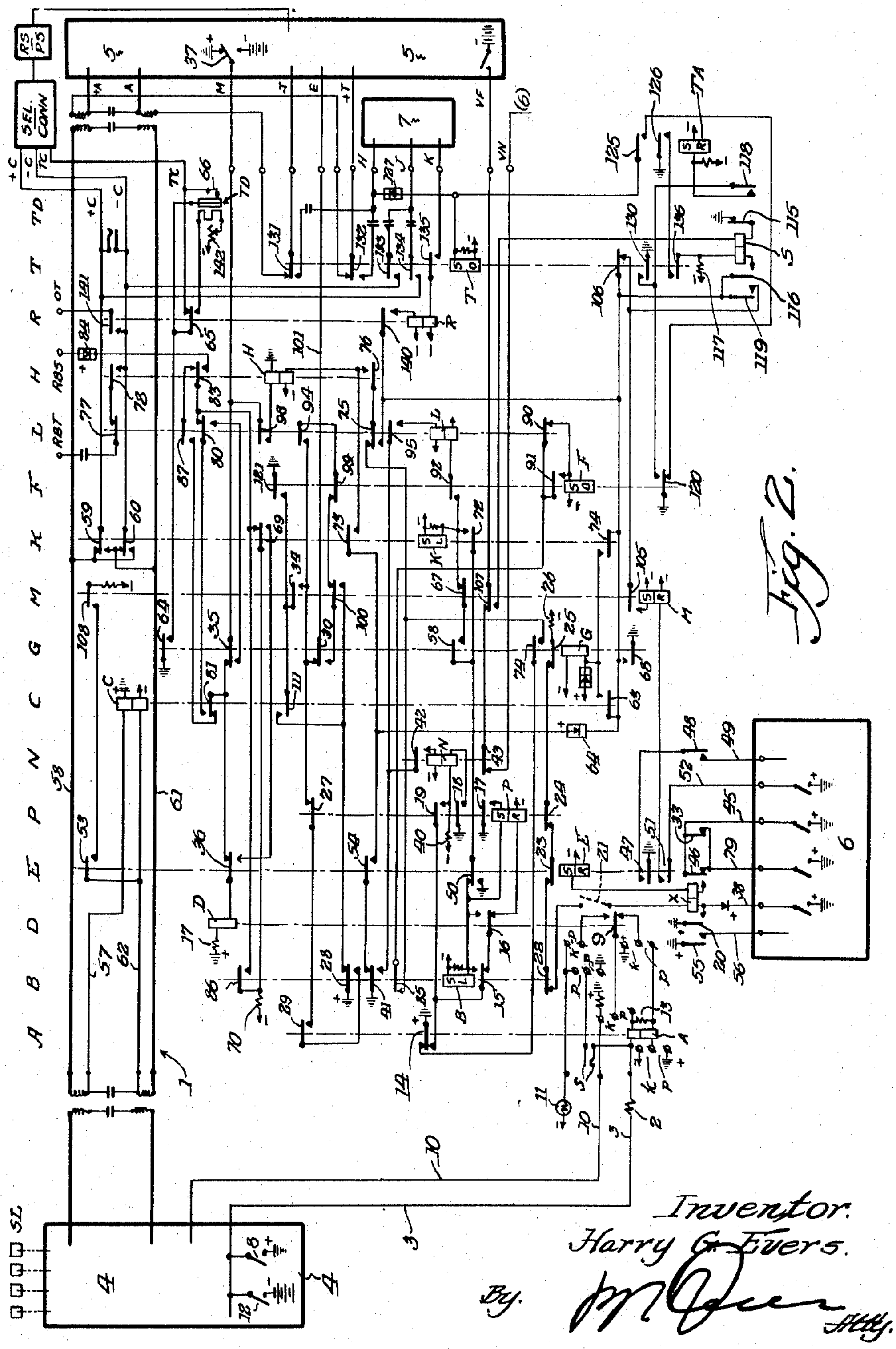

The above noted and other objects and features will appear from the description of an embodiment of the invention which will be rendered below with reference to the accompanying diagrammatic drawings, in which Fig. 1 is a simplified block diagram showing in schematic manner the principal components and their cooperation in the system; and Fig. 2 shows details of the adapter and its cooperation with control and signaling means as well as its coaction with a trunk and trunk switch associated therewith.

Known equipment including switching means for extending calls between subscribers in the local non-recorder exchange, also trunk control and trunk marker, check tone means and signaling means for providing, for example, ringback and busy or overflow busy tone, are shown only diagrammatically. The distant toll exchange and subscriber lines accessible thereto are likewise diagrammatically indicated. The coaction of the various component parts will however be explained as the description progresses.

A. *In general*

Referring to Fig. 1, numeral 1 indicates a trunk comprising conductors 58, 61 and 3 extending from a local dial exchange (equipment at the right of the vertical dot-dash line) to a distant toll exchange 4, which may be a generally known dial exchange or a manual exchange adapted to extend calls to or receive calls from subscriber stations SL, either directly or in known manner over intermediate switching equipment. Known toll ticketing and registering equipment (not shown) may be provided in the toll exchange 4. The trunk 1 terminates over usual repeater means in the trunk switch 5 associated therewith. The trunk switch is a generally known switching device adapted to extend calls to remote and local subscriber stations.

An adapter circuit (shown in detail in Fig. 2) is provided for cooperation with the trunk 1 and associated trunk switch 5. The adapter comprises among others a signal relay A connected to the signal conductor 3 of the trunk. The conductor 3 may terminate in a similar relay in the toll exchange 4. The purpose of relay A is to signal to the adapter incoming calls from the distant exchange (seizure of the trunk 1 and associated trunk switch 5); to signal over the conductor 3 outgoing calls to the distant exchange; and to perform pulse transmitting and supervisory functions.

Common trunk control and trunk marker means 6 is interconnected with the adapter, having known control functions which will be brought out as the description progresses. Also interconnected with the adapter is a check tone circuit 7 to provide a tone check for call verification purposes on outgoing toll ticketing calls. The calling subscriber in the local dial exchange (right of the vertical dot-dash line), after having reached over the trunk 1 the distant toll exchange 4 and the toll ticketing equipment therein, dials for verification purposes the digits of his own number which are transmitted by the adapter to the toll ticketing equipment for recording and at the same time to the associated trunk switch 5, to cause such trunk switch to set up a verification connection to the calling local station over the check tone circuit 7. The call is allowed to proceed responsive to proper station identification over the check tone circuit; improper station identification resulting in release of the call.

The trunk switch 5 has access to line circuits, such as LC, of local stations, one such station being shown at RS/PS; the letters RS indicating that the local station may be a regular station, and the letters PS indicating that it may be a paystation. The corresponding line circuit LC has access over a known switching device to known selector or connector switches, depending on the capacity of the local exchange (which may be a selector exchange requiring selectors and connectors or a 100-line exchange requiring connectors only), one such switch being indicated at SEL/CONN, these letters denoting that the corresponding switch may be a selector or a connector. The corresponding switch has in turn access to known switching equipment for establishing local calls and over a predetermined level or levels access to terminals connected with trunks such as the trunk 1. Seizure of the trunk involves seizure of the trunk switch 5 associated therewith and also of the adapter coacting with both the trunk and the associated trunk switch.

An incoming call from the distant exchange 4 may be extended either by an operator at such exchange or by a distant subscriber SL over a trunk such as the trunk 1 and the trunk switch 5 associated therewith, to a line circuit LC of a called local subscriber station, for example, a regular subscriber station RS. The adapter performs during the extension and during the progress of the call and incident to the release of the call all signaling and supervisory functions.

An outgoing call from a subscriber such as a regular subscriber RS or from a local paystation PS may be extended over a selector or connector SEL/CONN to the trunk 1 and the associated adapter and from there to an operator at the distant exchange 4 who may extend the call to a wanted subscriber SL, or the call may be extended to toll ticketing equipment at the distant exchange where the call is registered and thence to a wanted subscriber SL. The operator at the distant exchange may dial back to the calling trunk line 1 in order to complete an outgoing toll call for the calling local line by way of trunk switch 5 to a called subscriber line. In case of outgoing calls over the distant toll ticketing equipment, the calling local subscriber dials the number of his own line to register it at the toll ticketing equipment, thereby causing the adapter to transmit the corresponding impulse series simultaneously to the associated trunk switch 5 so as to operate the trunk switch to set up a verification call to the calling local line. The check tone circuit 7 cooperating to provide verification of correct station identification, all as mentioned before. All signaling and supervisory functions are again performed by the adapter.

The provision of the adapter cooperating with the trunk and the trunk switch and comprising means for performing all signaling and supervisory functions in the extension and during the progress and incident to the release of incoming operator and toll ticketing calls, as well as of outgoing operator and toll ticketing calls with dial back and call verification, provides great advantages, permitting the use of greatly simplified switching devices throughout the system.

Details of the invention will now be described particularly with reference to Fig. 2 in which the various components of Fig. 1 are indicated by identical references and shown identically located, although in part somewhat simplified.

At the lower left of Fig. 2 is shown the signal relay A, also indicated in Fig. 1, and a relay X having contacts 55, 20, 46, 33 and 48 connected respectively to conductors 56, 38, 79, 45 and 49 terminating in trunk control and trunk marker means 6. The conductor VN (marked (6) at the right hand side of the drawing) connects with all trunks using the same marker and is accordingly indicated by (6) to show the connection to the control 6. Relay X is operated so long as the circuit shown is idle, that is, so long as the trunk 1 and associated trunk switch 5 are available for service.

When a trunk such as 1 is seized incident to an incoming operator or toll ticketing call, or incident to an outgoing operator or toll ticketing call, all of which will be presently described in detail, the relay X will be released and such release causes the trunk control and marker device 6 to transfer subsequent calls in known manner to other trunks. After all trunks have been engaged one after the other, all relays X are normal, and ground is removed from the conductor 56 to the trunk control 6 by contacts such as 55 of the X relays of the various adapters, each cooperating with a trunk 1 and associated trunk switch 5, as shown. This causes the trunk control circuit 6 to place ground on the conductors 38 to close circuits over the left hand windings of the various X relays to battery on resistor 26, involving busy switch 21 and contacts 22, 23, 24 and 25, respectively controlled by relays B, E, P and G; such X relays operating and each X relay in every idle trunk locking over its contact 20. Blowing of the trunk fuse or opening of busy switch 21 releases the corresponding X relay, if operated, or prevents its reoperation, and thus makes the corresponding trunk busy. Details of the trunk control 6 are shown, for example, in copending application Ser. No. 295,401 filed June 25, 1952, now Patent 2,714,628. The novel feature consists in making the relay X a part of the new adapter to combine its operation with other functions to be presently described.

It will merely be necessary to bear in mind that relay X is operated so long as the trunk 1 with its associated trunk switch 5 and cooperating adapter is idle and ready for service in a call and that such relay X releases responsive to seizure of the corresponding trunk for extending a call.

The various relays are designated by letters which are repeated on top of Fig. 2 in a horizontal line to facilitate locating the corresponding relays. Battery and ground connections are indicated respectively by (—) and (+) symbols. The elements RBT and RBS and OT (top right of Fig. 2) indicate respectively ringback tone (RBT) and ringing interrupter (RBS) and busy tone or overflow busy tone (OT). The components appearing as rectangles indicate similar and in Fig. 1 identically marked known parts which will be described only to the extent required for an understanding of the invention.

B. *Signaling*

The previously mentioned means for two types of simplex or composite dialing and signaling comprises optional wiring indicated at the bottom left of Fig. 2 by letters "*k*" and "*p*." The "*k*" wiring requires an external polar differential duplex relay for signaling and dialing over the conductor 3.

Assuming that the wiring "*k*" is provided and that a call is originated at the distant exchange 4, ground (+) is applied to the conductor 3 by means diagrammatically shown as a contact 8. Current now flows from battery (—) over wiring connection *k*, windings of relay A, resistor 2 to ground (+) at 8 and relay A energizes. Relay A will follow all signals from the distant office 4, that is, all calling, dialing and supervision signals. In case of an outgoing call, relay D will be energized, in a manner to be presently described, to transmit a call signal to the distant office 4 by switching the conductor 10 from ground (+) on a relatively high resistance resistor 11, over wiring connection *k*, contact 9 of relay D, *k*—*p*, to battery (—) over a resistance lamp 11.

The wiring "*p*" is provided to use relay A as a neutral differential relay to a dial exchange. With the trunk idle, ground is connected through the windings of the signal relays at each end, the ground connection to the signal relay A extending over *p* at the bottom of such relay and, accordingly, no current flows over the signaling conductor 3. In order to signal an incoming call, the distant exchange switches its signal conductor from ground (+) to battery (—) by suitable means diagrammatically indicated by contact 12. Current now flows over both windings of relay A and this relay energizes.

The resistor 13 connected in parallel with relay A is with "*p*" wiring short-circuited over contact 9 of relay D. When the circuit is seized for an outgoing call, relay D is energized and operates contact 9 to alternate position, thereby removing the short-circuit from the resistor 13 and switching the signal conductor 3 to battery (—) over the lamp resistance 11. Battery is thereby also connected to the resistor 13 and through such resistor to the lower winding of relay A now connected to ground over wiring connection *p*. The resistor 2 connected in the signal conductor 3 is adjusted so as to limit current flow through the upper winding of relay A to a value which produces approximately the same number of ampere turns as are present in the lower winding, and since the windings oppose each other, relay A does not operate. Current flowing over the signal conductor 3 operates the corresponding signal relay in the distant exchange. To return answer supervision, the distant exchange switches its signal conductor from ground (+) to battery (−), and with battery of the same voltage connected to both ends of the signal conductor 3, current ceases to flow through the upper winding of relay A while current continues to flow from the local battery through resistance lamp 11, contact 9 in operated position (relay D being energized), wiring connection *p*, resistor 13, lower winding of relay A, to ground (+) over wiring connection *p*, allowing relay A to operate. When the signal conductor in the distant exchange is returned to ground, for dialing or supervision, the ampere turns in the two windings of relay A again become approximately equal and opposite and relay A restores.

C. *Incoming operator call*

When the trunk is seized at the distant exchange, relay A operates as explained above, to energize relay P over its lower winding in a circuit (1) extending from +, contact 14 of A, contact 15 of B, contact 16 of D, lower winding of P to −.

Relay P energizes closing its contact 17 and thereby connecting its upper winding in series with relay B. The lower winding of relay N is at the same time short-circuited by closure of contacts 18 and 19 of relay P in a circuit (2) from +, contact 14 of A, contact 19 of P, lower winding of N, contact 18 of P to +.

Relay X may at that time be operated over its left hand winding in a holding circuit (3) from +, contact 20, left hand winding of X, busy switch 21, contacts 22, 23, 24, 25 (respectively associated with relays B, E, P, G), resistor 26 to −. See also energizing circuit for X traced under "7."

Relay X, operated in the above circuit, will be released upon operation of P by opening of contact 24.

Relay B, upon operating in series with the upper winding of P opens the circuit extending to the lower winding of P at contact 15 and at the same time short-circuits the upper winding of P in a circuit (4) from +, contact 14 of A, contact 15 of B, upper winding of P, contact 17 of P to +.

Relay P accordingly restores and opens the short-circuit of its upper winding by opening its contact 17. Upon restoring, relay P closes its contact 27 to connect the trunk conductor E to ground in a circuit (5) from +, contact 28 of B, contact 29 of A, contact 27 of P, contact 30 of G, conductor E to the trunk switch.

The associated trunk switch circuit 5 is seized responsive to ground on conductor E. The trunk circuit may in known manner return dial tone to the operator if desired.

The operator extends the connection by dialing, thereby interrupting the circuit to relay A over the signal conductor 3. Relay A follows the dial pulses, actuating its contact 14 accordingly and thereby interrupting the circuit of relay B. The latter relay is slow-to-release and remains operated during the pulsing operation of A. At contact 29, relay A repeats the pulses to the associated trunk switch over conductor E.

When the call is answered, the associated trunk switch circuit 5 connects battery to the conductor M, thereby causing operation of relay D in a circuit (6) from −, conductor M, contact 35 of relay G, contact 36 of relay E, winding of relay D, to +.

Relay D, upon operating, actuates its contact 9 to extend answer supervision to the operator at 4 as already explained before.

When the called line disconnects, the trunk switch 5 reconnects conductor M to ground, by means diagrammatically indicated as a contact 37, thereby restoring relay D which restores its contact 9 to extend disconnect supervision to the operator at 4. Relay A restores responsive to disconnection of the operator, thereby opening its contact 29 to disconnect ground from the conductor E so as to allow the trunk switch 5 to restore, relay A also opening its contact 14 to cause relay B to release, the latter closing its contact 22 to prepare for reoperating relay X in a circuit (7) from + on conductor 38, left hand winding of X, busy switch 21, contacts 22, 23, 24, 25 (respectively controlled by relays B, E, P, G), resistor 26, to −. See also holding circuit for X traced under "3."

D. *Incoming toll ticketing call*

When the trunk is seized at the distance exchange 4, ground is connected to the signal conductor 3 as described before, causing relay A to operate. Relay A closes the circuit traced under "1" to operate relay P. Relay P opens at contact 27 the circuit for seizing the trunk switch, traced under "5" and closes at contact 17 the circuit for relay B and in series with its upper winding and further short-circuits the lower winding of relay N at contacts 18 and 19 (see circuit traced under "2"). At its contact 24, relay P opens the holding circuit for relay X traced under "3." Relay B, upon operating, opens at its contact 15 the circuit for the lower winding of relay P, at the same time short-circuiting the upper winding of relay P. See circuit traced under "4." Before relay P, which is slow-to-release, has had time to restore, ground is momentarily removed from the signal conductor 3 at the distant exchange. Relay A accordingly restores, interrupts the circuit to B at its contact 14, thereby removing the short-circuit from the lower winding of relay N and causing relay N to operate in a circuit (8) from +, contact 18 of P, lower winding of N, resistor 40, to −.

Relay N, upon operating, locks in a circuit (9) from +, contact 41 of B, contact 42 of N, upper winding of N, to −.

Upon operating, relay N disconnects at its contact 43 conductor VF of the associated trunk switch circuit 5 to prevent use of the trunk switch for verification purposes. Relay A, upon reoperating, recloses the circuit to B at contact 14, thereby restoring the short-circuit on the upper winding of relay P, traced under "4." Relay P restores opening at its contact 18 the starting circuit "8" for N and closes at contact 27 the circuit to the conductor E to seize the associated trunk circuit as traced under "5." Relay B, as said before, is slow-to-release and remains operated during the momentary interruption of the circuit at contact 14 of A upon release of A responsive to momentary interruption of ground on the signal conductor 3.

With A, B and N actuated, the operation to extend the connection and to provide answer supervision and to effect release, continues now as explained before under the heading "C. Incoming Operator Call."

E. *Outgoing call to operator*

With relay X operated in a holding circuit over its own contact 20, when the distant exchange trunk number is dialed, the trunk control circuit 6 applies ground to conductor 45, thereby extending ground over contact 46 of X to the right hand winding of X and through such winding to relay E to energize the latter in a circuit (10) from + on conductor 45, contact 46, right hand winding of X, winding of E, to −.

Relay E closes its contact 47 to extend ground over contact 48 of X to the conductor 49 of the marker and trunk control 7 so as to mark in such trunk control the position of the trunk. At its contact 50, relay E prepares a circuit for relay K, and at contact 51, relay M is connected to the conductor 52 of the trunk control 6 to test for a toll ticketing call. At contact 23, relay E opens the circuit traced under "3" extending over the busy switch 21 to the left hand winding of relay X; at contact 53, a short-circuit is prepared for the lower winding of relay C; at contact 36, a circuit is prepared for relay D; and at contact 54, a circuit is prepared for relay H and another circuit for relay G. At contact 55, relay X has applied ground to conductor 56 of the trunk control and marker unit 6. Ground on conductors 56 and 49 cause the calling switch to extend the calling line to conductors +C and —C (top right of drawing), thereby closing over the line loop, for relay C, a circuit (11) from +, upper winding of C, conductors 57, 58, contact 59 of K, conductor +C, line loop, conductor —C, contact 60 of K, conductors 61, 62, lower winding of C, to —.

The above traced energizing circuit is effective if the call is from a regular subscriber station RS. In case of a call from a paystation PS, battery will be connected to the +C conductor to operate relay C over its upper winding in a circuit from battery (—) on +C, contact 59 of K, conductors 58, 57, upper winding of C, to ground (+).

Relay C, upon operating, closes its contact 63 to energize relay G in a circuit (12) from +, contact 41 of B, contact 54 of E, rectifier 64, contact 63 of C, relay G, to —.

Relay G, upon operating, grounds the test or private conductor TC to hold the calling line in a circuit (13) from +, contact 64 of G, contact 65 of R, conductor TC; or alternatively, in a circuit over contact 66 of TD.

Relay G also operates relay K in a circuit (14) from +, contact 50 of E, contact 58 of G, contact 67 of M, winding of K, to —.

At contact 25, relay G opens a point in the original energizing circuit for relay X, traced under "3"; and at contact 68, relay G closes for itself a holding circuit (15) from +, contact 68 of G, contact 63 of C, winding of G, to —.

Relay K operates in the circuit traced under "14" actuating its contacts 59 and 60 thereby reversing battery to the calling line to permit talking from a paystation without coin deposit. At contact 69, relay K closes for relay D a circuit (16) from —, resistor 70, contact 69 of K, contact 36 of E, winding of relay D, resistor 71, to +.

Relay D upon operating in the circuit "16," actuates its contact 9 to transmit to the distant exchange "off-hook" supervision as explained previously.

At contact 72, relay K locks itself in a circuit (17) from +, contact 50 of E, contact 72 of K, winding of K, to —.

At contact 73, relay K closes for relay H a circuit (18) from +, contact 41 of B, contact 54 of E, contact 73 of K, lower winding of H, to —; thereby causing H to operate.

At contact 74, relay K closes a point in an alternate holding circuit for G.

Relay H operates its contact 76, locking itself in a circuit (19) from +, contact 14 of A, contact 74 of G, contact 75 of L, contact 76, lower winding of H to —.

Relay H also prepares to start the ringing interrupter RBS and connects ringback tone conductor RBT to the calling line in a circuit (20) RBT conductor, contact 77 of L, contact 78 of H, conductor —C, to the calling line.

The control equipment 6 now removes ground from conductor 45, thereby opening the circuit extending over the right hand winding of X and winding of E. Relay X restores, removing ground from conductors 56 and 49, and at contact 33 shifts the circuit of conductor 45 over conductor 79 to make the trunk busy. Relay E, upon restoring, places its contact 36 into the normal position shown, thereby opening the circuit "16" to relay D, and restores its contact 50 to open the circuit "14" to relay K. At contact 51, relay E disconnects relay M from conductor 52 and at contact 54 it opens the operating circuit "18" of relay H. Contact 23 of E is closed to prepare the reset circuit "7" for relay X.

Relay D restores momentarily, thereby actuating its contact 9 to extend disconnect supervision to the distant exchange as described before. Relay K restores, returning normal battery to the calling line over its contacts 59 and 60. Relay D reoperates now in a circuit (21) from —, resistor 70, contact 80 of L, contact 81 of C, contact 36 of E, winding of D, resistor 17 to +.

Upon reoperating, relay D actuates its contact 9 as already described to extend "off-hook" supervision again to the distant exchange.

The ringing interrupter RBS is now started by connecting battery over the resistor 70 to conductor RBS over contact 69 of K in a circuit (22) from —, resistor 70, contact 69 of K, contact 83 of H, rectifier 84, conductor RBS to the ringing interrupter.

Ringback tone is supplied to the calling line over contacts 77 of L and 78 of H. The momentary reversal of battery to the calling line prepares the paystation equipment, and the momentary flash of disconnect supervision causes the distant exchange equipment to extend the call to the toll operator.

The answer supervision will be described next, bearing in mind that relays C, D, G and H are operated. When the operator answers, ground over the signal conductor 3 operates relay A. Relay A closes the circuits to relays B and K by way of contacts 14 of A, contacts 15 of B, contacts 16 of D, to relay B and by way of contacts 50 of E, contacts 58 of G, contacts 67 of M to relay K and opens the locking circuit "19" of relay H. Upon operating, relay B actuates its contact 15, thus transferring its circuit and the circuit of relay K to locking ground at contact 14 of A. At contact 85, relay B prepares a circuit for relay F; at contact 22, a point is opened in the circuit "3" to relay X; and at contact 86, relay B closes for relay D and alternate holding circuit. (23) from —, resistor 70, contact 86 of B, contact 80 of L, contact 81 of C, contact 36 of E, winding of D, resistor 17, to +.

Relay H restores and opens its contact 78 to remove ringback tone, also returning contact 83 to normal to stop the interrupter by disconnecting battery from conductor RBS. Relay K operates and reverses battery to the calling line at contacts 59 and 60, for paystation identification, and short-circuits contact 63 of C by connecting contact 74 in parallel therewith, thereby providing another holding path for relay G extending in a circuit (24) from winding of G, contact 74 of K, to ground on contact 68 of G.

Release of G if the calling line should disconnect, is thus prevented because relay G will continue to hold over its contact 68 and contact 74 of K after opening of contact 63 of C upon restoration of C responsive to disconnection of the calling line. At contact 72, relay K short-circuits contacts 58 and 67 of relays G and M to lock K under control of relay A in a circuit (25) from +, contact 14 of A, contact 15 of B, contact 50 of E, contact 72 of K, winding of K to —.

If the operator extends the connection beyond the toll exchange, no further operations occur in the adapter circuit until release of the connection. If the operator extends the connection back over the trunk, operations will proceed in accordance with the dial back connection to be presently described after first explaining operations incident to the release.

In considering the release, it must be borne in mind that relays C, D, G, A, B and K are operated. When the calling party disconnects, the calling switch opens the loop to relay C (conductors +C and —C) and C restores. Upon restoring, relay C opens the circuit "21" to D at contact 81 and at contact 63 opens a point in the holding circuit "15" of G. Relay D restores and at contact 9 extends disconnect supervision to the distant operator. When the operator disconnects, relay A will restore and open the circuit "25" to K and also the circuit (26) from +, contact 14 of A, contact 15 of B, winding of B; and contact 50 of E, contact 58 of G, contact 67 of M, winding of K, to —.

Upon restoring, relay B further opens at its contact 86 the circuit "23" to D, and at contact 22 prepares the reset circuit "7" for relay X. Relay K restores and opens at contact 74 the circuit "24" to relay G. Relay G now restores, returning the adapter circuit to normal.

F. *Outgoing call to operator—dial back connection*

Returning now to the previously mentioned dial back feature, it should be remembered that relays C, D, G, A, B and K are operated as they are operated just prior to the relase explained in the immediately preceding paragraphs.

To dial back over the trunk, the operator prefixes a digit, for example digit "1," to the wanted number, thereby causing pulsing operation of relay A. Upon restoring, relay A interrupts at its contact 14 the circuit "25" to B and K, at the same time closing at such contact a circuit to F (27) from +, contact 14 of A, contact 74 of G, contact 85 of B, contact 90 of L, winding of F, to —.

Relay F operates, locking momentarily through its contact 91 and preparing at contact 92 a circuit for L. Relay A, upon reoperating, opens at contact 14 the above traced circuit to F which is slow-to-release and remains operated for an interval; relay A also recloses the circuit to B and K and causes operation of L in a circuit (28) from +, contact 14 of A, contact 15 of B, contact 50 of E, contact 58 of G, contact 67 of M, contact 92 of F, lower winding of L, to —.

Relay L operates and locks in a circuit (29) from +, contact 41 of B, contact 95 of L, upper winding of L, to —.

Upon operating, relay L opens the circuit "23" to D and connects D and the upper winding of H to conductor M of the trunk switch 5 in a circuit (30) from ground at 37 on conductor M in the trunk switch, contact 35 of G, contact 80 of L, contact 81 of C, contact 36 of E, winding of relay D, resistor 17, to ground; and contact 98 of L to the upper winding of H.

Relay D is thus short circuited to restore after which it is prepared for reoperation to extend answer supervision from the associated trunk switch. Relay F now restores and grounds conductor E to cause seizure of the trunk switch for dial back operation, the grounding of conductor E being effected in a circuit (31) from +, contact 28 of B, contact 29 of A, contact 27 of P, contact 94 of L, contact 99 of F, contact 100 of M, contact 30 of G, conductor 101 to conductor E of the trunk switch 5.

Relay F, upon restoring also opens at contact 92 the initial operating circuit of L over its lower winding, and at contact 91 opens a point in its own holding circuit over its upper winding. Relay D restores, operating its contact 9 as already described to extend "on hook" supervision to the operator until the called station answers, or until the calling station recalls the operator.

Relay A repeats subsequent series of impulses to the trunk switch 5 over conductor E to route the call to the desired destination and coincidentally interrupts the circuit to B and K. These relays are, however, slow-to-release and hold during the pulsing.

Operator recall will be described next, keeping in mind that relays C, G, A, B, K and L are operated. To recall the operator, the subscriber at the calling station flashes the hookswitch, thereby causing pulsing operation of relay C. Whenever C restores during such flashing, it closes at its contact 81 to operate relay D from ground, winding of relay D, contacts 36 of E, contacts 81 of C, contacts 87 of L, contacts 83 of H, contacts 86 of B, resistor 70 to negative battery, and the latter relay upon operating actuates its contact 9 to extend "off-hook" supervision to the distant exchange 4 as described before.

Returning now to the completion of the dial back connection and when the call is completed and the call is answered (relays C, G, A, B, K and L being operated as noted before), the trunk switch 5 connects at 37 battery, instead of ground, to conductor M, thereby closing the circuit "30" to relays D and H. Relay H now operates in a circuit (32) from +, upper winding of H, contact 98 of L, conductor M, to — in the trunk switch circuit 5.

Upon operating, relay H locks over its contact 76 and its lower winding in a circuit (33) from +, contact 68 of G, contact 75 of L, contact 76 of H, lower winding of H, to battery.

Relay D operates from battery on conductor M and extends over its contact 9 answer supervision to the distant exchange.

If the called station disconnects (relays C, G, A, B, K, L, H and D being operated), the trunk switch 5 removes battery from conductor M, thereby opening the circuit to relay D. If the calling station disconnects, the relay C restores and at contact 81 opens the circuit to D. Since relay H has opened the circuit to D, at its contact 83, relay D restores in either case and extends disconnect supervision to the distant exchange over its contact 9.

Relays C and D are now restored, leaving relays G, A, B, K, L and H operated. The operator at the distant exchange has received the disconnect signal as described, and when the operator disconnects, release is effected. Relay A restores first, opening at its contact 29 circuit "31" to remove ground from conductor E, thereby freeing the associated trunk switch 5, and opening the circuits "26" and "25" to relays B and K. Relay K restores, extending at its contacts 59 and 60 normal battery to the calling line and opening contact 74 to interrupt circuit "24" to relay G. Relay B restores and opens at its contact 41 the locking circuit "29" to relay L which restores and opens contacts 98 and 75 to interrupt circuits "33" and "32" of relay H, causing H to release. Relay G restores, its circuit "24" having been opened, and removes at contact 64 ground from conductor TC to allow the calling station circuit "13" to release. Relay G, at its contact 25, connects battery over resistor 26 to the selection chain circuit "7" (relay X) to prepare resetting of the circuit by ground on conductor 38 from the control circuit "7."

G. *Outgoing call—automatic toll ticketing*

When the trunk is seized for an automatic toll ticketing call, relay X being operated, ground is connected to conductor 45, completing circuit "10" to operate relay E and to hold relay X over its right hand winding. Relay E, upon operating, closes its contact 53 to prepare a short-circuit around the lower winding of relay C. At contact 47, relay E connects ground to conductor 49 to mark the position of the seized trunk switch; at contact 51, ground on conductor 52 is extended to the lower winding of relay M to mark the call for automatic toll ticketing; and at contact 54, relay E prepares a circuit for relay G. Relay M operates from ground connected to conductor 52, contact 51 of E, lower winding of M, to —, and locks through its contact 105 in a circuit (34) from +, contact 41 of B, contact 54 of E, rectifier 64, contact 106 of T, contact 105 of M, upper winding of M, to —.

Relay M upon operating opens at contact 67 the circuit to K to prevent its operation responsive to closure of contact 58 upon subsequent operation of G; at contact 107, relay M prepares a point in the circuit to conductor VF and relay S; and at contact 108, relay M short-circuits the lower winding of relay C to prevent seizure of the circuit by a paystation.

The calling line is extended to conductors +C, —C and TC by the SEL-CONN switch under control of the control equipment 6 and the control equipment removes ground from conductors 45 and 52, thereby disconnecting the lower winding of relay M (which continues to hold over its upper winding) and interrupting the holding circuit of relay X (right hand winding) and relay E. Relay E is slow-to-release and continues to hold for an interval, thereby keeping contact 53 closed and the lower winding of C short-circuited.

If the call is extended from a paystation PS, ground is applied to the conductor —C from the paystation equipment, such ground extending over contact 60 of K and conductors 61, 62 to the lower winding of C, and since the lower winding is short-circuited, C cannot operate and the circuit will release.

If the call is from a regular station RS, C will operate in the circuit "11" over the calling line loop, closing at its contact 63 the circuit "12" to relay G and preparing at contact 81 a circuit for relay D. Relay G operates and locks over its contact 68 in the circuit "15" extending over contact 63 of relay C; at contact 64, relay G connects ground to conductor TC to hold the calling line, and places a further holding ground on relay M in a circuit (35) from +, contact 68 of G, contact 106 of T, contact 105 of M, upper winding of M to —.

Conductor E is grounded by relay G at contact 30, to seize the associated trunk switch and to prepare it for verification, over a circuit (36) from +, contact 28 of B, contact 100 of M, contact 30 of G, conductor E to the trunk switch.

At contact 25 of relay G, a point is opened in the circuit "3" to the left hand winding of relay X. Relays X and E now release. Relay E removes at contact 53 the short-circuit around the lower winding of C; at contact 51, the lower winding of M is disconnected from conductor 52; at contact 47, ground is removed from conductor 49; and at contact 36, relay E closes for relay D a circuit (37) from —, resistor 70, contact 69 of K, contact 80 of L, contact 81 of C, contact 36 of E, winding of D, to +.

Relay D operates and signals the distant exchange by actuating its contact 9 as already explained.

Relays M, C, G and D are now operated; the calling subscriber's station has been extended to the distant exchange, and the calling subscriber may now dial the digits necessary to reach the toll ticket recording equipment.

Relay C follows the corresponding dial impulses received, interrupting the circuit of relay D at contact 81 and the circuit of G at contact 63. Relay G is slow-to-release and remains operated during the impulses, holding M operated in its circuit over its upper winding. Relay D follows the impulses and repeats them to the distant exchange over conductor 3 by actuating its contact 9.

When the recorder at a distant exchange is ready to receive the calling station number, the answer supervision signal is returned from the distant exchange over conductor 3, operating relay A which closes at contact 14 to operate B by way of contacts 15 and 16; the latter relay actuating its contact 15 to lock itself over contact 14 of A and to open a point in the circuit to the lower winding of P. At contact 85, relay B prepares a circuit for relay F; at contact 28, ground is disconnected from one side of contact 111 of C, thus opening an alternate circuit to conductor E.

Relay C is actuated again responsive to the next series of impulses, constituting a digit in the number of the calling station and, in addition to repeating the impulses to relay D for transmission to the distant exchange, repeats the pulses to the trunk switch 5 by way of conductor E over the circuit (38) from +, contact 28 of B, contact 29 of A, contact 27 of P, contact 34 of M, contact 111 of C, contact 100 of M, contact 30 of G, conductor E, trunk switch 5.

The trunk switch is thereby caused to select the dialed hundred group and to prepare for verification call connecting battery to conductor VF to operate relay S in a circuit (39) from — in the trunk switch circuit 5, conductor VF, contact 107 of M, right hand winding of S, contact 115 of S, to +; relay S locking over its left hand winding in a circuit (40) from +, contact 68 of G, contact 116 of S, left hand winding of S, resistor 117, to —.

Upon operating, relay S closes its contact 118 to prepare a circuit for relay TA; at contact 115, the circuit, "39" is opened to disconnect the right hand winding of S, thereby removing ground from conductor VF; and closure of contact 119 completes for M another holding circuit (41) from +, contact 68 of G, contact 119 of S, contact 105 of M, upper winding of M, to —.

The subscriber at the calling station dials the remaining digits of his line number, thereby causing the associated trunk switch 5 to establish a verification connection to his line and to the distant exchange recorder to record the calling line number. Before the party digit is dialed, the recorder in the distant exchange removed answer supervision, releasing relay A. Upon restoring, relay A opens at contact 14 the circuit to relay B and closes the circuit "27" to relay F; at contact 29, ground is removed from conductor E (circuit "38"). Relay F, upon operating, closes for relay TA at contact 120 a circuit (42) from +, contact 120 of F, contact 118 of S, winding of TA to —.

Relay F also closes its contact 121 to connect ground to conductor E of the trunk switch 5 a circuit (43) from +, contact 121 of F, contact 111 of C, contact 100 of M, contact 30 of G, conductor 101, to conductor E.

A single pulse is, upon completion of circuit "43," transmitted to complete a party selection in the associated trunk and to cause the trunk to complete a verification path to the calling line, while the recorder in the distant office follows the pulses of D to register the party digit. Relay B, upon restoring, opens at contact 85 the circuit "27" to relay F; at contact 28, ground is placed on conductor E (circuit "36") and contact 111 of C is short-circuited, to prevent further impulses over conductor E to the trunk switch, in a circuit (44) from +, contact 121 of F, contact 111 of C, contact 100 of M, contact 30 of G, conductor E.

Relay TA operates in the circuit "42," preparing at contact 125 a circuit for relay T and conductor H; and at contact 126 a short-circuit for the left hand winding of relay S. Relay F, upon restoring opens at contact 120 the circuit to the slow-to-release relay TA, thereby closing for relay T and for conductor H a circuit (45) from +, contact 120 of F, contact 125 of TA, winding of relay T to —; and placing parallel thereto over rectifier 127 ground on conductor H.

Ground on conductor H seizes the tone check circuit. Relay T, upon operating, closes contact 130 to hold TA; connects conductor H at contacts 131, 132 to both the +T and —T conductors of the trunk switch verification circuit by way of capacitors shown; connects conductor J at contacts 133, 134 to the +C and —C conductors by way of capacitors shown; connects at contact 135 the lower winding of R to conductor K; opens at contact 106 the holding circuits "34" and "35" for the upper winding of M; and at contact 136 completes for the left hand winding of S a short-circuit (46) from +, contact 68 of G, contact 116 of S, left hand winding of S, contact 136 of S, contact 126 of TA, to +.

Assuming that the trunk switch 5 has in its verification operation reached the terminals of the calling line, the circuit between conductors H and J is complete, and test tone from the toll ticketing tone check circuit 7 is applied to the capacitor simplex of the calling line (conductors +C and —C) over conductor J, and to the capacitor simplex of the verification call (conductors —T and +T) over conductor H, to verify that the calling line has been properly identified. The recorder in the distant exchange has also registered the corresponding line number. No change takes place in the tone check circuit 7, and the call is allowed to proceed as will be presently described.

Relay S restores, its left hand winding having been short-circuited by the operation of T, and upon restoring, relay S opens at contact 118 the circuit "42" to TA and at contact 119 opens the remaining locking circuit "41" of the slow-to-release relay M. Upon restoring, relay M opens contact 100 to remove ground from conductor E (circuit "36") so as to cause release of the verification call established by the associated trunk switch 5. Relay TA restores, opening contact 125 to remove ground from conductor H and relay T (circuit "45"). The removal of ground from conductor H releases the tone check circuit 7, and T upon restoring, removes the simplex tone circuits on conductors H and J and opens at contact 135 the circuit to the lower winding of relay R.

If the calling line has been improperly identified, the tone circuit between conductors H and J will be incomplete when the tone check is made, causing the tone check circuit to apply ground to conductor K, thereby operating relay R over its lower winding, relay R locking under the control of relay G in a circuit (47) from +, contact 68 of G, contact 140 of R, upper winding of R to —.

Relay R, upon operating closes contact 141 to connect overflow busy tone OT to the calling line over conductor —C; opens at contact 65 circuit "13" to remove ground from conductor TC, at the same time closing for TD a circuit (48) from +, contact 64 of G, contact 65 of R, resistor 142 connected to TD, to —.

The resistor 142 is variable to provide for a delay of TD of approximately 30 seconds. Relay S upon restoring, opens, as noted before, contact 118 (circuit "42") to relay TA, and at contact 119 opens the locking circuit "41" of relay M; relay M, upon restoring, removing at contact 100 ground from conductor E to release the verification call set up by the trunk switch 5. TA restores, opening at contact 125 the circuit "45" to T and conductor H. Relay T restores and opens the simplex tone circuits and at contact 135 opens the operating circuit of relay R over the lower winding thereof. After a delay of approximately 30 seconds, the time delay relay TD opens its contact 66, thus removing ground from conductor TC (circuit "13") to allow the preceding switching devices to release, thereby disconnecting the calling line from the trunk. The calling loop is now open and relay C restores and opens at contact 63 the circuit "15" to G and at contact 81 the circuit "21" to D. Relay G restores, opening at contact 68 the circuit "47" to release R and at contact 64 the circuit to release TD. Relay D restores and extends over contact 9 disconnect supervision to the distant exchange, thereby freeing the trunk and returning the adapter to normal.

If the calling line has been properly identified by the verification call, as described before, the calling party may dial the digits necessary to reach the desired party and the call is extended. When the called party answers, answer supervision is returned over the switch train involved through the recorder exchange to the calling exchange (relays C, D and G in the adapter being operated), causing operation of A which closes the circuit "26" to B and K. Relay B operates and transfers its circuit and the circuit of K to ground at contact 14 of A and at contact 86 closes the alternate holding circuit "23" for D. Relay K operates, locks at contact 72 in the circuit "25" under control of A; closes at contact 74 the alternate circuit "24" to G, and at contacts 59 and 60 reverses battery to the calling switch for supervisory purposes, if desired.

Release of the circuit is effected when the parties involved in the call hang up as explained before in connection with the release of an outgoing call to the operator.

If the outgoing toll ticketing call encounters a busy condition (relays C, D and G in the adapter being operated), busy or overflow tone instead of answer supervision is returned to the calling party, and therefore A, B and K do not operate. When the calling party hangs up, C, D and G restore as explained before in connection with the release of an outgoing call to the operator.

Known relay and associated contact means may be used throughout to effect the described operations of the switching devices in the distant exchange as well as in the switching devices in the local dial exchange including the trunk switch 5, the trunk control 6 and the check tone circuit 7.

Changes may be made within the scope and spirit of the appended claims.

I claim:

1. In a telephone system, a local exchange having local subscriber stations connected thereto, a toll exchange, other subscriber stations accessible to said toll exchange, a two-way trunk line interconnecting said exchanges, an adapter trunk circuit terminating said trunk line at said local exchange, a trunk switch connected to said adapter trunk circuit; said trunk line, said adapter circuit, and said trunk switch being utilized in extending incoming calls from said other subscriber stations to said local subscriber stations; said trunk line, said adapter circuit, and said trunk switch being utilized in extending outgoing calls from said local subscriber stations to said other subscriber stations; a first relay in said adapter trunk circuit operated responsive to predetermined dial impulses transmitted from a calling local subscriber station in extending an outgoing call to said toll exchange, circuit means controlled by the operation of said relay for repeating and transmitting said predetermined dial impulses over said trunk line to said toll exchange a second relay in said adapter trunk circuit released upon operation of said first relay to release said first relay momentarily, said first relay effective to control said circuit means to transmit a preliminary impulse to said toll exchange to thereby condition said toll exchange to process said call as a toll call, and other circuit means also controlled by the operation of said relay for repeating and transmitting said predetermined dial impulses to operate said trunk switch to extend a connection to said calling local subscriber station.

2. In a telephone system, a local exchange having local subscriber stations connected thereto, a toll exchange, other subscriber stations accessible to said toll exchange, a two-way trunk line interconnecting said exchanges, an adapter trunk circuit terminating said trunk line at said local exchange, a trunk switch connected to said adapter trunk circuit; said trunk line, said adapter trunk circuit, and said trunk switch being utilized in extending incoming calls from said other subscriber stations to said local subscriber stations; said trunk line, said adapter trunk circuit, and said trunk switch being utilized in extending outgoing calls from said local subscriber stations to said other subscriber stations; a signal-in relay in said adapter trunk circuit operated responsive to a signal received over said trunk line prior to receipt of dial pulses from said toll exchange for operating another relay for conditioning said adapter circuit to prevent use of said trunk switch as a verification switch and condition it for setting up toll connections to called subscriber stations, means controlled by said operation of said signal-in relay for transmitting control signals to operate said trunk switch, a dial impulse-responsive relay operated responsive to dial impulses received from calling local subscriber stations involved in outgoing calls to said other subscriber stations, a signal-out relay controlled by the operation of said dial impulse-responsive relay for transmitting signals to said toll exchange for setting up connections to called ones of said other subscriber stations, means for operating said signal-out relay to transmit call supervisory signals, said dial impulse-responsive relay operated responsive to predetermined dial impulses received from said calling subscriber station for repeating said predetermined dial impulses to correspondingly operate said signal-out relay to repeat and transmit said predetermined dial impulses over said trunk line to said toll exchange, said dial impulse-responsive relay simultaneously repeating said predetermined dial impulse to operate said trunk switch to cause a call supervisory operation thereof, a tone signal circuit, a control relay operable only incident to the simultaneous transmission of said predetermined dial impulses to said toll exchange and to said trunk switch for connecting said tone signal circuit to said trunk switch, and a relay governed by said control relay for controlling the connection of said tone signal circuit.

3. In a telephone system, a local exchange having local subscriber stations connected thereto, a toll exchange, other subscriber stations accessible to said toll exchange, a two-way trunk line interconnecting said exchanges, an adapter trunk circuit terminating said trunk line at said local exchange, a trunk switch connected to said adapter trunk circuit, means for seizing said adapter trunk circuit and said trunk switch responsive to an incoming call received over said trunk line from said toll exchange, said means comprising a signal responsive relay and a first impulse repeating circuit in said adapter trunk circuit responsive to a preliminary impulse from said toll exchange and thereafter controlled by impulses received over said trunk line from said toll exchange for operating said seized trunk switch to extend a connection to a called local subscriber station, local seizure means for seizing said adapter trunk circuit responsive to the initiation of a predetermined outgoing trunk call from a local calling subscriber station for extending said outgoing trunk call over said trunk line to said toll exchange, means in said adapter circuit controlled over said trunk line from said toll exchange for seizing said trunk switch in case said predetermined outgoing trunk call is for a predetermined called one of said other subscriber stations, a second impulse repeating circuit in said adapter trunk circuit controlled by impulses received over said trunk line from said toll exchange for operating said seized trunk switch to extend said predetermined outgoing call towards said predetermined called other subscriber station, said local seizure means operative for seizing said adapter trunk circuit and said trunk switch responsive to the initiation of another type of outgoing trunk call from a local calling subscriber station and for extending said other outgoing trunk call over said trunk line to said toll exchange, means in said adapter trunk circuit operated after said last mentioned seizure responsive to said calling local subscriber station dialling his own calling telephone number for operating said trunk switch to extend a connection to said calling local subscriber station and for transmitting impulses corresponding to said calling station number over said trunk line to said toll exchange.

4. In a telephone system, a local exchange having local subscriber stations connected thereto, a toll exchange, other subscriber stations accessible to said toll exchange, a two-way trunk line interconnecting said exchanges, an adapter circuit terminating said trunk line at the local exchange, a trunk switch connected to said adapter trunk circuit; said trunk line, said adapter trunk circuit, and said trunk switch being utilized in extending incoming calls from said other subscriber stations to said local subscriber stations; said trunk line, said adapter trunk circuit, and said trunk switch being utilized in extending outgoing calls from said local subscriber stations to said other subscriber stations; means in said adapter trunk circuit for seizing said trunk switch in response to the receipt of an incoming call over said trunk line and in response to the initiation of outgoing calls from said local subscriber stations, impulse transmitting means in said adapter trunk circuit for operating said trunk switch after seizure, said impulsing means including a first pulsing circuit for operating said trunk switch effective responsive to the receipt of impulses received over said trunk line from said toll exchange in extending an incoming call to said local subscriber stations, said impulsing means including a second pulsing circuit for operating said trunk switch effective responsive to the receipt of impulses received over said trunk line in extending a dial-back outgoing call from said local subscriber stations, and said impulsing means including a third pulsing circuit for operating said trunk switch effective responsive to the receipt of impulses received from a calling local subscriber station in extending a toll-ticketing outgoing call.

5. In a telephone system as claimed in claim 4 wherein said trunk switch is operated as a verification switch by said third pulsing circuit on said outgoing toll ticketing calls and wherein said trunk switch is operated to complete a talking connection to a called subscriber station by said first pulsing circuit on said incoming calls, including a relay in said adapter circuit operative in response to a signal received over trunk line from said toll exchange for preventing the operation of said trunk switch being used as a verification switch on said incoming calls.

References Cited in the file of this patent

UNITED STATES PATENTS

| | | |
|---|---|---|
| 2,297,365 | Ostline | Sept. 29, 1942 |
| 2,369,868 | Taylor et al. | Feb. 20, 1945 |
| 2,569,650 | Balzer et al. | Oct. 2, 1951 |
| 2,782,257 | Blashfield et al. | Feb. 19, 1957 |